United States Patent
Gal et al.

(10) Patent No.: US 11,411,801 B2
(45) Date of Patent: Aug. 9, 2022

(54) NETWORK PERFORMANCE ROOT-CAUSE ANALYSIS

(71) Applicant: salesforce.com, inc., San Francisco, CA (US)

(72) Inventors: Shauli Gal, Mountain View, CA (US); Satish Raghunath, Sunnyvale, CA (US); Kartikeya Chandrayana, San Francisco, CA (US); Gabriel Tavridis, San Francisco, CA (US); Kevin Wang, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/675,479

(22) Filed: Aug. 11, 2017

(65) Prior Publication Data

US 2019/0052518 A1 Feb. 14, 2019

(51) Int. Cl.
| | |
|---|---|
| G06F 15/173 | (2006.01) |
| H04L 41/0631 | (2022.01) |
| H04L 43/08 | (2022.01) |
| H04L 67/75 | (2022.01) |
| H04L 41/5009 | (2022.01) |
| H04L 67/56 | (2022.01) |
| H04L 41/22 | (2022.01) |
| H04L 41/06 | (2022.01) |

(52) U.S. Cl.
CPC ...... *H04L 41/0631* (2013.01); *H04L 41/5009* (2013.01); *H04L 43/08* (2013.01); *H04L 67/36* (2013.01); *H04L 41/06* (2013.01); *H04L 41/22* (2013.01); *H04L 67/28* (2013.01)

(58) Field of Classification Search
CPC ..... H04L 41/0631; H04L 41/22; H04L 43/08; H04L 67/28
See application file for complete search history.

(56) References Cited

U.S. PATENT DOCUMENTS

| | | | |
|---|---|---|---|
| 7,184,935 B1 | 2/2007 | Cohen et al. | |
| 8,086,708 B2 | 12/2011 | Breitgand et al. | |
| 8,966,055 B2 * | 2/2015 | Mittal | H04L 41/22 709/224 |
| 9,923,793 B1 * | 3/2018 | Gore | H04L 67/42 |
| 10,164,842 B2 * | 12/2018 | Rizzi | H04L 43/045 |
| 10,212,063 B2 * | 2/2019 | Nataraj | H04L 29/08072 |
| 2007/0083515 A1 | 4/2007 | Gwizdaloski | |
| 2008/0225748 A1 * | 9/2008 | Khemani | H04L 47/20 370/254 |

(Continued)

OTHER PUBLICATIONS

United States Patent and Trademark Office, U.S. Appl. No. 15/722,746, Notice of Allowance dated Jun. 13, 2019.

*Primary Examiner* — Chris Parry
*Assistant Examiner* — Dixon F Dabipi
(74) *Attorney, Agent, or Firm* — Wong & Rees LLP; Kirk D. Wong

(57) ABSTRACT

A data-driven approach to network performance diagnosis and root-cause analysis is presented. By collecting and aggregating data attribute values across multiple components of a content delivery system and comparing against baselines for points of inspection, network performance diagnosis and root-cause analysis may be prioritized based on impact on content delivery. Alerts may be generated to present recommended courses of action based on the tracked performance analysis.

18 Claims, 6 Drawing Sheets

(56) References Cited

U.S. PATENT DOCUMENTS

| | | | |
|---|---|---|---|
| 2009/0106349 A1* | 4/2009 | Harris | H04L 67/02 709/203 |
| 2012/0226804 A1* | 9/2012 | Raja | H04L 43/028 709/224 |
| 2013/0173778 A1* | 7/2013 | Hsy | H04L 43/14 709/224 |
| 2015/0244580 A1* | 8/2015 | Saavedra | H04L 43/04 709/221 |
| 2015/0295778 A1* | 10/2015 | Hsiao | H04L 43/0894 715/736 |
| 2015/0339263 A1 | 11/2015 | Ata et al. | |
| 2016/0125293 A1* | 5/2016 | Patel | H04L 41/0681 706/47 |
| 2016/0182328 A1* | 6/2016 | Bhasin | H04L 43/067 709/224 |
| 2017/0112379 A1 | 4/2017 | Swiston et al. | |
| 2017/0302539 A1 | 10/2017 | Park et al. | |
| 2017/0359735 A1 | 12/2017 | Jain et al. | |
| 2019/0104037 A1 | 4/2019 | Gal et al. | |
| 2020/0052995 A1 | 2/2020 | Gal et al. | |

* cited by examiner

NETWORK PERFORMANCE ROOT-CAUSE ANALYSIS

The present invention relates generally to identifying anomalies in content delivery and, in particular, to presenting root-cause analysis for network performance using a data driven approach.

BACKGROUND

Cellular networks are very volatile and diverse. Due to the nature of the wireless channel, link conditions change at a fine timescale. Metrics such as latency, jitter, throughput, and losses are hard to bound or predict. The diversity comes from the various network technologies, plethora of devices, platforms, and operating systems in use.

Techniques that rely on compression or right-sizing content do not address the fundamental issues of network volatility and diversity as they impact the transport of data. Irrespective of the savings in compression, the data still has to weather the vagaries of the network, operating environment, and end device.

Transmission Control Protocol (TCP) plays an important role in the content delivery business: it provides a reliable, ordered, and error-checked delivery of a stream of octets between applications running on hosts communicating by an IP network. Major Internet applications, such as the World Wide Web, email, remote administration, and file transfer, rely on TCP. Many applications (apps) rely heavily on network transactions to deliver a functional user experience. When failures relating to apps are observed by users, app owners seek to find the root-cause. Challenges faced by app owners include sifting through mountains of data to decide which metrics may be of interest, lack of domain expertise (e.g., network infrastructure, client-side, or server-side topology), lack of measurement data to diagnose the issues affecting one or more parts of the network, and a lack of prioritization of the issues that are impacting performance of the app.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
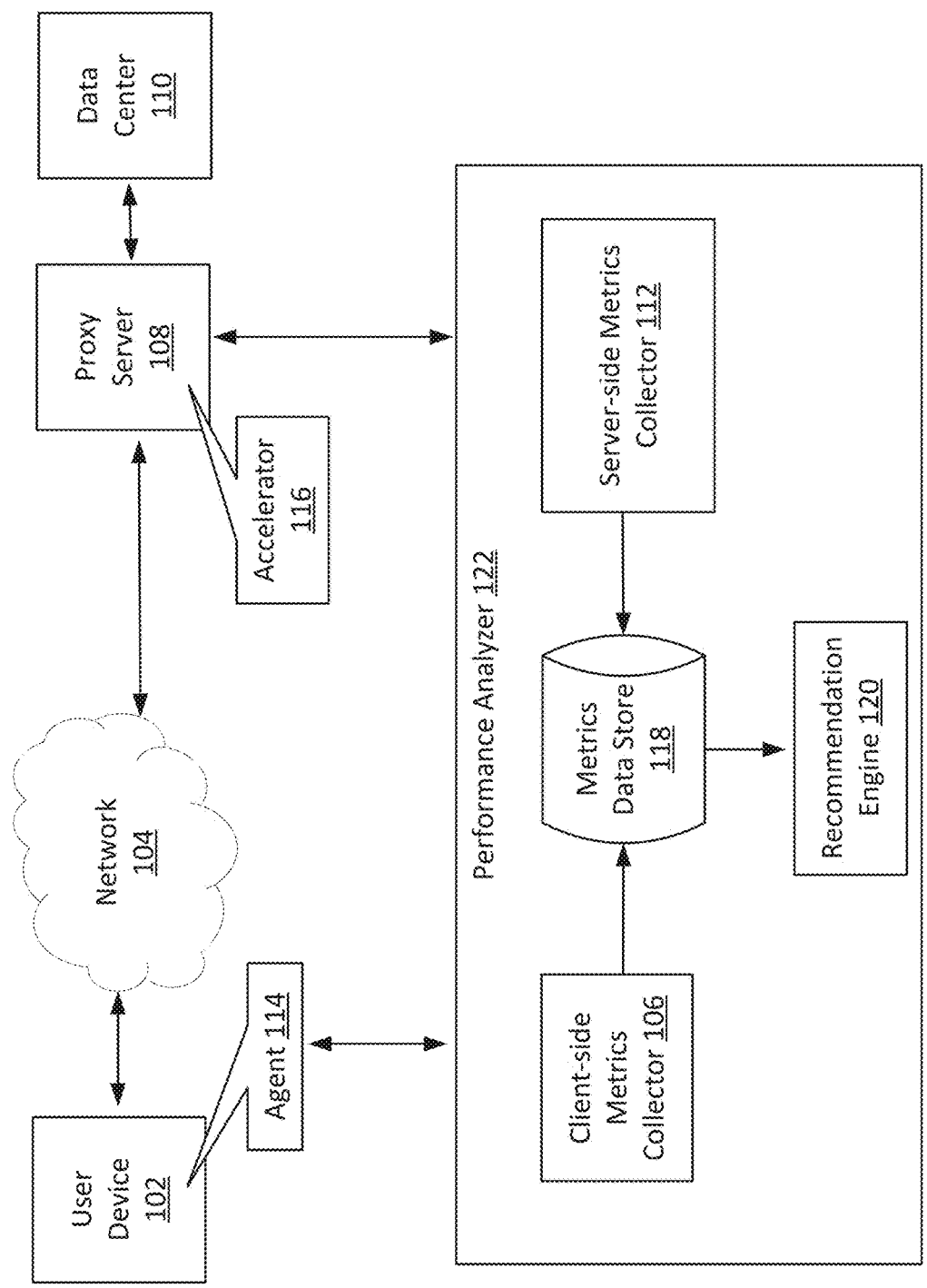
FIG. 1 illustrates a high-level block diagram, according to an embodiment of the invention.

Example embodiments, which relate to cognitive analysis of network performance data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. General Overview
2. Measuring Data Attribute Values Based on Network Transactions
3. Tracking Anomalies in Network Performance
4. Assessing the Impact of Exceeding a Threshold
5. Generating Alerts Based on Impact and Performance Analysis
6. Implementation Mechanisms—Hardware Overview
7. Equivalents, Extensions, Alternatives, and Miscellaneous

1. GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Modern data transport networks feature a huge variety of network technologies, end-user devices, and software. Some of the common network technologies include cellular networks (e.g., LTE, HSPA, 3G, 4G, older technologies, etc.), WiFi (e.g., 802.11xx series of standards, etc.), satellite, microwave, etc. In terms of devices and software, there are smartphones, tablets, personal computers, network-connected appliances, electronics, etc., that rely on a range of embedded software systems such as Apple iOS, Google Android, Linux, and several other specialized operating systems. There are certain shared characteristics that impact data delivery performance:

a. Many of these network technologies feature a volatile wireless last mile. The volatility manifests itself in the application layer in the form of variable bandwidth, latency, jitter, loss rates and other network related impairments.

b. The diversity in devices, operating system software and form factors results in a unique challenge from the perspective of user experience.

c. The nature of content that is generated and consumed on these devices is quite different from what was observed with devices on the wired Internet. The new content is very dynamic and personalized (e.g., adapted to location, end-user, other context sensitive parameters, etc.).

A consequence of these characteristics is that end-users and applications experience inconsistent and poor performance. This is because most network mechanisms today are not equipped to tackle this new nature of the problem. In terms of the transport, today's client and server software systems are best deployed in a stable operating environment where operational parameters either change a little or do not change at all. When such software systems see unusual network feedback they tend to over-react in terms of remedies. From the perspective of infrastructure elements in the network that are entrusted with optimizations, current techniques like caching, right sizing, and compression fail to deliver the expected gains. The dynamic and personalized nature of traffic leads to low cache hit-rates and encrypted traffic streams that carry personalized data make content modification much harder and more expensive.

Modern heterogeneous networks feature unique challenges that are not addressed by technologies today. Unlike the wired Internet where there was a stable operating environment and predictable end device characteristics, modern heterogeneous networks require a new approach to optimize data delivery. On the client side, a device's make and model, operating system (OS), OS application programming interfaces (APIs), and one or applications may impact performance of an application. Within an access network, various network infrastructure attributes may affect a network transaction between a client and a server, such as various network technologies, round-trip latency, bandwidth, network operator, geography, and time. Meanwhile, on the server side, a server's OS, location, network peering, and application software may further impact app performance and affect a network transaction of data between a client and the server. Pinpointing a root cause of a failure of a functional user experience becomes a difficult challenge because of the enormity of data available to an app owner, lack of domain expertise on the part of an app developer investigating network infrastructure and/or server issues, lack of measurement data to diagnose network issues, and a lack of a prioritization framework to attach a priority to a problem by estimating a benefit of fixing the problem.

An embodiment performs network performance root cause analyses and generates notifications of issues affecting performance at various parts of a multiple-component system. An embodiment partitions the problem into distinct areas of the application, network, and/or server infrastructure such that an app owner may quickly identify the area where the problem lies and locate the appropriate resources to start solving the problem. Key metrics may be correlated across multiple points in the network to provide informative insights. The issues may also be prioritized based on an impact on performance so that an app owner may select an area to start solving a problem that will objectively have the most impact on performance of the app.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. MEASURING DATA ATTRIBUTE VALUES BASED ON NETWORK TRANSACTIONS

The performance of data delivery is closely tied to the operating conditions within which the end-device is operating. With ubiquitous wireless access over cellular and WiFi networks, there is a lot of volatility in operating conditions, so acceleration techniques must adapt to such a network by adapting to these conditions, e.g., the performance achievable over a private WiFi hotspot is very different from that with a cellular data connection. An accelerator 116, as illustrated in FIG. 1, dynamically adapts to these conditions and picks the best strategies based on the context.

The context captures the information about the operating conditions in which data transfer requests are being made. This includes, but is not limited to, any combination of:

Type of device, e.g., iPhone, iPad, Blackberry, etc.
   This may also include the hardware version of the device and manufacturer information.
Device characteristics, e.g., the type of its modem, CPU/GPU, encryption hardware, battery, NFC (Near Field Communication) chipset, memory size and type or any other hardware information that impacts performance
Mobility of device, e.g., whether the device is on a moving vehicle/train etc., or is stationary/semi-stationary.
Operating System on the device.
Operating System characteristics, e.g., buffering, timers, public and hidden operating system facilities (APIs), etc.
   This may also include operating system limitations such as number of simultaneous connections allowed to a single domain, etc.
Usage information related to various device elements, e.g., Memory, Storage, CPU/GPU etc.
Battery charge and mode of powering the device.
Time of day.
Location where available.
IP Address and port numbers.
Network type, e.g., WiFi or Cellular, or 3G/4G/LTE, etc., or Public/Home WiFi, etc.
   SSID (Service Set Identifier) in WiFi networks.
   802.11 network type for WiFi networks.
Service Provider information, e.g., AT&T or Verizon for cellular, Time Warner or Comcast for WiFi, etc.
Strength of signal from the access point (e.g., Wi-Fi hot spot, cellular tower, etc.) for both upstream and downstream direction.
Cell-Tower or Hot-Spot identifier in any form.
Number of sectors in the cell tower or hot spot.
Spectrum allocated to each cell tower and/or sector.
Any software or hardware limitation placed on the hotspot/cell tower.
Any information on the network elements in the path of traffic from device to the content server.
Firewall Policy rules, if available.
Any active measurements on the device, e.g., techniques that measure one-way delay between web-server and device, bandwidth, jitter, etc.
Medium of request, e.g., native app, hybrid app, web-browser, etc.
   Other information describing the medium, e.g., web browser type (e.g., Safari, Chrome, Firefox etc.), application name, etc.
Any other third party software that is installed on the device which impacts data delivery performance.

Content Type, e.g., image, video, text, email, etc.
  Also includes the nature of content if it is dynamic or static.
Content Location, e.g., coming from origin server or being served from a CDN (Content Delivery Network). In the case of a CDN, any optimization strategies being employed, if available.
Recent device performance statistics, e.g., dropped packets, bytes transferred, connections initiated, persistent/on-going connections, active memory, hard disk space available, etc.
Caching strategies if any, that are available or in use on the device or by the application requesting the content.
In the case of content, where multiple objects have to be fetched to completely display the content, the order in which requests are placed and the order in which objects are delivered to the device. The request method for each of these objects is also of interest.

Based on the operating context, a cognitive engine may recommend, but is not limited to, any combination of: end-device based data delivery strategies and accelerator-based data delivery strategies.

End-device based data delivery strategies refer to methods deployed by an application (an application could be natively running on the end-device operating system, or running in some form of a hybrid or embedded environment, e.g., within a browser, etc.) to request, receive, or transmit data over the network. These data delivery strategies include, but are not limited to, any combination of:

Methods used to query the location of service point, e.g., DNS, etc.
  This may involve strategies that include, but are not limited to, any combination of: choosing the best DNS servers based on response times, DNS prefetching, DNS refreshing/caching, etc.
Protocols available for data transport, e.g., UDP, TCP, SCTP, RDP, ROHC, etc.
Methods to request or send data as provided by the operating system, e.g., sockets, CFHTTP or NSURL-Connection in Apple's iOS, HttpUrlConnection in Google's Android, etc.
Session oriented protocols available for requests, e.g., HTTP, HTTPS, FTP, RTP, Telnet, etc.
Full duplex communication over data transport protocols, e.g., SPDY, Websockets, etc.
Caching and or storage support provided in the Operating System.
Compression, right sizing or other support in the devices to help reduce size of data communication.
Transaction priorities which outline the order in which network transactions are to be completed:
  E.g., this may be a list of transactions where the priority scheme is simply a random ordering of objects to be downloaded.
Content specific data delivery mechanisms, e.g., HTTP Live Streaming, DASH, Multicast, etc.
Encryption support in the device:
  Also includes secure transport mechanisms, e.g., SSL, TLS, etc.
VPN (Virtual Private Network) of any kind where available and/or configured on the device.
Any tunneling protocol support available or in use on the device.
Ability to use or influence rules on the device which dictate how the data needs to be accessed or requested or delivered.
  This includes, but is not limited to, any combination of: firewall rules, policies configured to reduce data usage, etc.
Ability to pick the radio technology to use to get/send data. For example, if allowed, the ability to choose cellular network to get some data instead of using a public Wi-Fi network.
Ability to run data requests or process data in the background.
Threading, locking, and queuing support in the Operating System.
Ability to modify radio power if available.
Presence and/or availability of any error correction scheme in the device.
In cases where middle boxes in the network infrastructure have adverse impact on performance, capabilities on the end-device to deploy mitigations such as encrypted network layer streams (e.g. IPSec, etc.).

A range of parameters determines the performance of tasks such as data delivery. With volatility and diversity, there is an explosion in the number of parameters that may be significant. By isolating parameters, significant acceleration of data delivery may be achieved. Networks, devices and content are constantly changing. Various methods of optimizing data delivery are described in U.S. Patent Publication No. 2014/0304396, entitled "Cognitive Data Delivery Optimizing System," filed Nov. 12, 2013, and which is hereby incorporated by reference in its entirety for all purposes. Embodiments are not tied down by assumptions on the current nature of the system. An adaptive network performance optimizer 106 may use raw network traffic data to generate an adaptive learning dataset.

FIG. 1 and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g. "102" in the text refers to reference numerals "102a," and/or "102b" in the figures). Only one user device 102 (end-devices as described above) is shown in FIG. 1 in order to simplify and clarify the description.

As illustrated in FIG. 1, a system 100 includes a user device 102 that communicates data requests through a network 104. A proxy server 108 may receive the data requests and communicate the requests to a data center 110. A performance analyzer 122 may receive, or gather, information from the proxy server 108 and/or an agent 114 operating on a user device 102 and store information in a metrics data store 118, in an embodiment. For example, data attribute values may be measured at a proxy server 108, such as quantifying how long a server, located in a data center 110, takes to respond if the proxy server 108 is close enough to the server. Other server-side metrics may be determined by a server-side metrics collector 112 and stored in the metrics data store 118. Similarly, a client-side metrics collector 106 may determine and gather client-side metrics from an agent 114 operating on the user device 102, such as measuring a download complete time of an object at the agent 114. This measurement can capture the time taken to place the request on the network, the time taken for the server to respond and the time taken for the response to reach the user and render on the user's screen. As a result, the download complete time of an object is a composite measurement of the system that includes the user device 102, the network 104, proxy server 108, and data center 110.

Each database record in the metrics data store 118 may include data attribute values associated with one or more points of inspection. A point of inspection may be defined by an administrator user or app owner user. A point of inspection may be a data attribute that may contribute to a failure in the user experience, such as a failure to retrieve a data object or a perceived slowdown in network connectivity. For example, data representing outcomes of the network transaction such as the download complete time, may be captured in a database record in the metrics data store 118 as a data attribute value associated with the point of inspection (download complete time). Performance metrics such as latency in download complete time compared to a baseline defined by an administrator user may also be stored in the metrics data store 118, in one embodiment.

Other information may also be included in each database record, in other embodiments. Typical sources of data relating to the network environment are elements in the network infrastructure that gather statistics about transit traffic and user devices that connect to the network as clients or servers. The data that can be gathered includes, but is not limited to, any combination of: data pertaining to requests for objects, periodic monitoring of network elements (which may include inputs from external source(s) as well as results from active probing), exceptional events (e.g., unpredictable, rare occurrences, etc.), data pertaining to the devices originating or servicing requests, data pertaining to the applications associated with the requests, data associated with the networking stack on any of the devices/elements that are in the path of the request or available from any external source, etc.

In an embodiment, a component may be installed in the user device 102 (agent 114) that monitors the real-time operating conditions, participates and performs active network measurements, and executes recommended strategies. The agent 114 may be supplied in a software development kit (SDK) and is installed on the user device 102 when an application that includes the SDK is installed on the user device 102. By inserting an agent 114 in the user device 102 to report the observed networking conditions back to the accelerator 116, estimates about the state of the network can be vastly improved. The main benefits of having a presence (the agent 114) on the user device 102 include the ability to perform measurements that characterize one leg of the session, e.g., measuring just the client-to-server leg latency, etc., that are not measurable outside of the user device 102.

An accelerator 116 sits in the path of the data traffic within a proxy server 108 and executes recommended strategies in addition to gathering and measuring network-related information in real-time. The accelerator 116 may propagate network policies to the proxy server 108, in one embodiment. In another embodiment, the agent 114 may implement one or more network policies. For example, the optimal number of simultaneous network connections may be propagated as a network policy through the network 104 to the agent 114 embedded on the user device 102. As another example, the transmission rate of file transfer may be limited to 20 MB/sec by the accelerator 116 as a network policy.

Once a multitude of data attribute values associated with requests between user devices 102 and the data centers 110 are logged in the metrics data store 118, it becomes possible to aggregate this data by inspection point. For example, aggregated data by inspection point at an app measuring response time might be transformed into an alert that states an app has a high response time in comparison to a baseline and that the impact of fixing the response time may be a certain percentage reduction in response time. Other examples may include measuring the number of abandoned sessions as a percentage of total sessions, the measured time of a launch to first image request, image server(s) latency, image size of objects sent over different types of networks, and small image (e.g., less than 4 KB) requests ratio.

A performance analyzer 122 may include a client-side metrics collector 106 and a server-side metrics collector 112 that may store data attribute values captured at an agent 114 and a proxy server 108, respectively, into the metrics data store 118. A recommendation engine 120 may then retrieve data attribute values from the metrics data store 118, individually and/or aggregated, to form recommendations for an administrator user to troubleshoot and/or diagnose root-causes of perceived slowdowns in the performance of the app. The recommendation engine 120 may include various rules-based functionality to determine recommendations, as configured by an administrator user of the performance analyzer 122.

The recommendation engine 120 may include one or more functions, such as forming a baseline for key attributes, tracking defined inspection points, or items, for anomalies, and assessing the impact of an inspection item. To determine if there is a problem, the recommendation engine 120 may maintain a baseline of expected behavior associated with a defined inspection point. The baseline may be a combination of expert input (e.g., manual entry of a baseline value by an administrator) and an aggregate function of data from historical data. For example, the download complete time for static objects of 100 kilobytes (KB) in size over LTE networks in the US West coast may have a median value of 200 milliseconds (ms) over the past 7 days, while an expert input may indicate an acceptable baseline to be 250 ms to override this formulaic (e.g., an aggregate function of data from historical data) choice. In this way, the recommendation engine 120 may be configured by one or more of the expert input and a formulaic choice, in an embodiment.

Key attributes may be defined by administrator users, in one embodiment. In other embodiments, key attributes may be selected based on past historical data, such as metrics that have had a history of problems and/or issues. Other attributes may be defined as tracked points of inspection by administrators, in an embodiment. For example, a high response time, high number of 3xx HTTP status codes for images indicating further action may need to be taken by a user agent to complete the request due to the content of the request being moved to a different URL, slow network speeds, and so on may be example data attributes that occur at different areas of the system. For example, response time may be measured at the app, whereas response time for a server may be measured at the server. Further, a high number of 3xx HTTP status codes may be measured at a server, whereas a network speed may be measured at a network.

3. TRACKING ANOMALIES IN NETWORK PERFORMANCE

Figure 2:
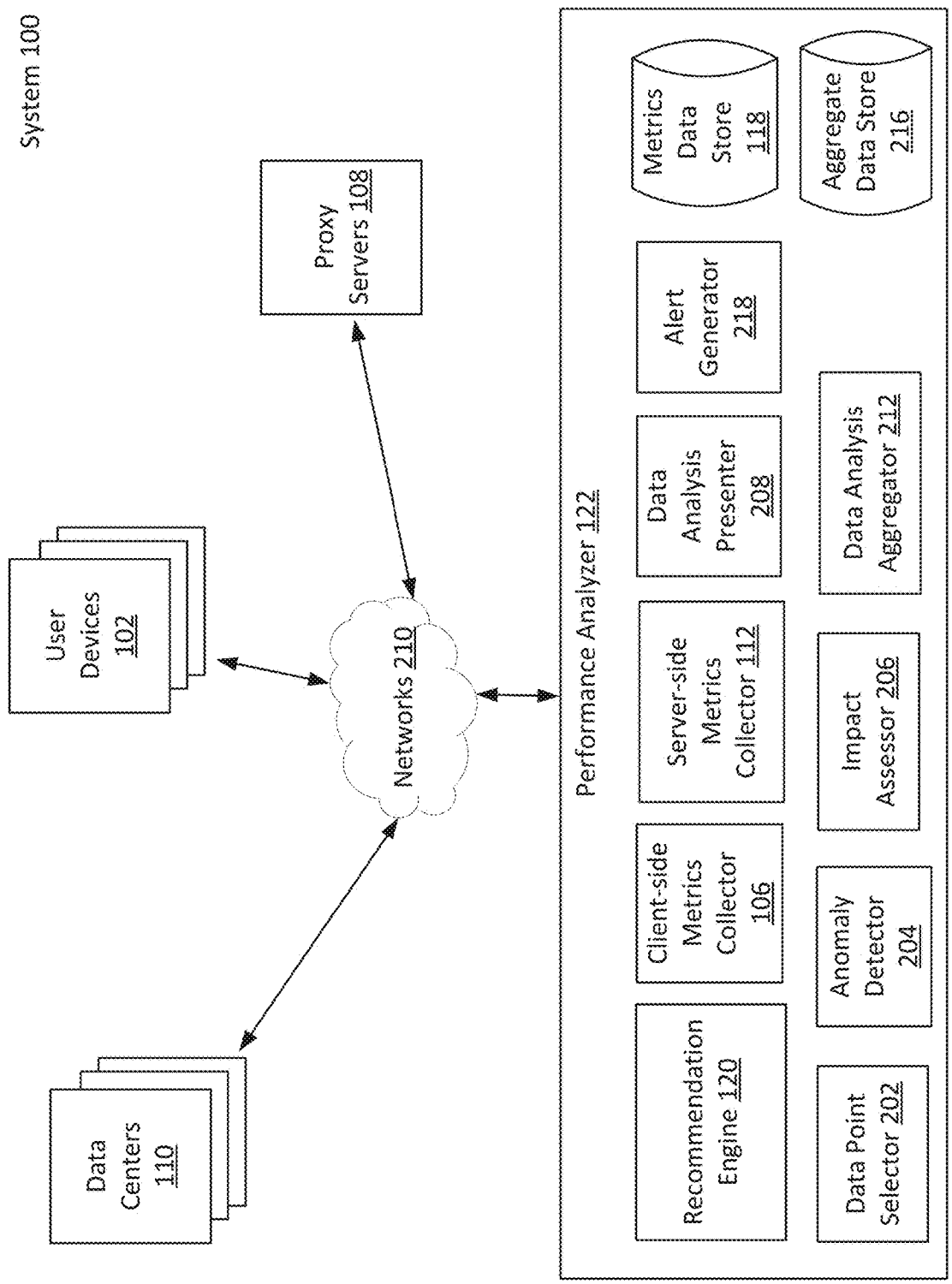
FIG. 2 illustrates a high-level block diagram, including an example performance analyzer according to an embodiment of the invention.

FIG. 2 illustrates a high-level block diagram, including an example performance analyzer, according to an embodiment. A performance analyzer 122 may include a recommendation engine 120, a client-side metrics collector 106, a server-side metrics collector 112, a data analysis presenter 208, an alert generator 218, a metrics data store 118, an aggregate data store 216, a data point selector 202, an anomaly detector 204, an impact assessor 206, and a data analysis aggregator 212, in one embodiment. The performance analyzer 122 may communicate data over one or more networks 210 with other elements of system 100, such as user devices 102, one or more proxy servers 108, and one or more data centers 110.

A client-side metrics collector 106 collects one or more data attribute values associated with data requests between user devices 102 and data centers 110 through one or more proxy servers 108. In one embodiment, a data attribute value may be collected by an agent 114 of a user device 102. Similarly, a server-side metrics collector 112 collects one or more data attribute values associated with data requests between data centers 110 and user devices 102 through one or more proxy servers 108. A data attribute value may be collected by the server-side collector 112 from a proxy server 108 that is near the data center 110. In another embodiment, information about networks 210 may be gathered as data attribute values associated with the data requests between the user devices 102 and data centers 110 by one or both of the client-side metrics collector 106 and the server-side metrics collector 112. This information about one or more of the networks 210 is stored in the metrics data store 118 by the agent 114 or by the proxy server 108, in an embodiment.

A data point selector 202 enables an administrator user of the performance analyzer 122 to select a data point, or point of inspection, in which data attribute values are collected by the client-side metrics collector 106 or the server-side metrics collector 112, in one embodiment. For example, an administrator user may identify a data point as an inspection point to track over time. In another embodiment, a data point may be selected based on historical data that indicates the data point to have a large impact on performance and perceived slowdowns on the app. This data point, after selection, may be referred to as a diagnosis point, in one embodiment. In this way, the data point may be selected by the data point selector 202 based on past occasions where an administrator performed a fix that had a large impact on performance based on historical data. One or more parameter modifications (e.g., performing a fix, etc.) may be performed at the diagnosis point to achieve better network performance.

An anomaly detector 204 uses one or more methods or techniques to detect an anomaly. For example, a statistical method may be used to detect an anomaly as a data attribute value having a variance larger than a threshold set by the administrator user, in one embodiment. As another example, a baseline may be inputted by the administrator user such that an anomaly is detected having various levels, such as moderate, severe, extreme, and so forth, based on the impact of the anomaly on performance. In a further embodiment, an anomaly may be detected based on a baseline and its variance from the standard deviation (the baseline). Other methods of anomaly detection may be used by the anomaly detector 204.

An impact assessor 206 determines an impact of an anomaly based on a projected change in a metric of interest that can be considered desirable. For example, if the image size was higher by 20% from the baseline for LTE networks, the impact assessor 206 may compute the additional time spent downloading those bytes empirically from the data store values and project that as the impact for this inspection item. As a result, if 10 images are downloaded in a median LTE session and resizing them would result in a savings of 60 ms each, the best case savings would be 600 ms. This impact may be presented to an administrator user as a benefit, in one embodiment. The value of the impact may be expressed in time savings or other types of savings, such as less abandoned sessions.

A data analysis presenter 208 presents data analysis based on the collected data attribute values around an inspection point. For example, an administrator user may be presented with a user interface that enables the user to view, at a glance, data analysis about the collected data attribute values in a tabular format according to the version of the app that was released. An app inspection report may be generated by the data analysis presenter 208, in one embodiment, that shows the detailed information about the collected data attribute values, such as columns of data including the name of the inspection point, topology, network, value, baseline, and benefit (impact). More, or less, columns of data may be presented by the data analysis presenter 208 in other embodiments. In another embodiment, data attribute values may be plotted on graphs or presented against other types of data and presented to a user. For example, aggregated data attribute values may be transformed into alerts, and the number of alerts may be plotted as a graph and organized by time of day and date. The graph may be generated by the data analysis presenter 208 and displayed to a user via a graphical user interface.

A data analysis aggregator 212 aggregates data attribute values over a fixed period of time (e.g., a month, a week, a day, hour, etc.) for each inspection point. When users, such as domain experts, perform a traditional root cause analyses, they usually are presented with unhelpful error messages that do not lead them to what went wrong to cause the slowdown in performance. Here, data analysis is performed by the system to present more descriptive information that helps provide more context around what may have caused the issue. At an inspection point, users may expect to arrive at a description of the problem. This description is called an inspection item, or inspection point. For example, an inspection item may be the size of image requests over LTE networks, and this may have been determined to be the cause of high latency when the value of the image size was higher than desired. A data analysis aggregator 212 aggregates data, such as image size, and determines an aggregate data metric over a period of time, such as a day. The aggregate data metric, such as a median of the image sizes of requests throughout the day, is generated by the data analysis aggregator 212. Once the aggregate data metric is determined from data attribute values stored in the metrics data store 118, the aggregate data metric may be stored in an aggregate data store 216, in an embodiment.

Based on a baseline, an alert is generated by the alert generator 218. For example, the alert generator 218 gathers one or more information items from one or more of the aforementioned modules, such as the recommendation engine 120, client-side metrics collector 106, server-side metrics collector 112, impact assessor 206, data analysis aggregator 212, and data stores including the metrics data store 118 and aggregate data store 216. Data is collected by the client-side metrics collector 106 and/or server-side metrics collector 112 and is stored in the metrics data store 118. Then, the data analysis aggregator 212 performs various statistical aggregations, as needed, and that aggregated data is stored in the aggregate data store 216. Administrators of the system may determine a baseline for a particular metric, such as a baseline download time for a file size under 5K, based on experimental use, business-driven choices and/or priorities, levels of service provided, and so forth.

A baseline may also be automatically generated by the system based on historical data captured in the metrics data store 118 and/or aggregate data store 216. For example, the impact assessor 206 determines an impact of a slow performing network on the download time of a file larger than 5 MB. The impact may be measured in time-metrics, such as the additional time needed to download the time or as a percentage of increased time needed to download the same file after a threshold speed of the network. This threshold may then be determined to be a baseline by the alert generator 218 because the impact of crossing the baseline may have an undesired impact. What constitutes "undesired" may vary based on the type of metric, but "undesired" may be defined using business logic and/or a series of programmed rules in the system.

In another embodiment, the recommendation engine 120 may automatically determine a baseline given the situational data stored in the metrics data store 118 and/or aggregate data store 216. For example, the recommendation engine 120 may determine that an impact of 5% or more on perceived slowdown in network performance is the baseline for a particular set of metrics that produces that outcome. The particular set of metrics may vary, such as a slow down of a particular network at a particular time of day (e.g., 3-5 PM EST in New York City on the LTE network). This may produce an outcome that impacts the network performance greater than 5%. As a result, that particular set of metrics may be used as a baseline by which an alert is generated by the alert generator 218.

Other combinations of metrics may be used to determine other baselines that are used to generate other alerts in other embodiments. Any combination of the following metrics may be used by the alert generator 218 to form a baseline by which an alert is generated, including device make and model, client operating system, operating system APIs, application(s) operating on the user device, network technology, round-trip latency, bandwidth, network operator, geography and time, server operating system, server location, network peering, and/or application software operating on the server. Each of these metrics affect a portion of the system performance, whether that's client performance, access network performance, or server performance Because the recommendation engine 120 may recommend a "fix" or addressing a problem that is having a measurable impact on system performance that exceeds a baseline, the system is able to provide one or more reliable recommendations to improve a portion of the system (client, network, and/or server side) that will improve overall network performance as perceived by users. This recommendation may be automatically generated by the recommendation engine 120 using a rules based engine, expert-entered baselines, automatically generated baselines, and/or impact assessment metrics based on regression analysis using data stored in one or both of the metrics data store 118 and/or aggregate data store 216. As a result, the system has improved its own performance by using metrics data that covers app performance, user device performance, network performance, and server performance. Using that metrics data, data analysis is generated to point to specific areas of the system that can be improved and a concrete assessment of the impact of that improvement will have on the overall performance of the system. The recommendation engine 120 provides more accurate insight into analyzing specific application performance than previous and traditional implementations.

Figure 5:
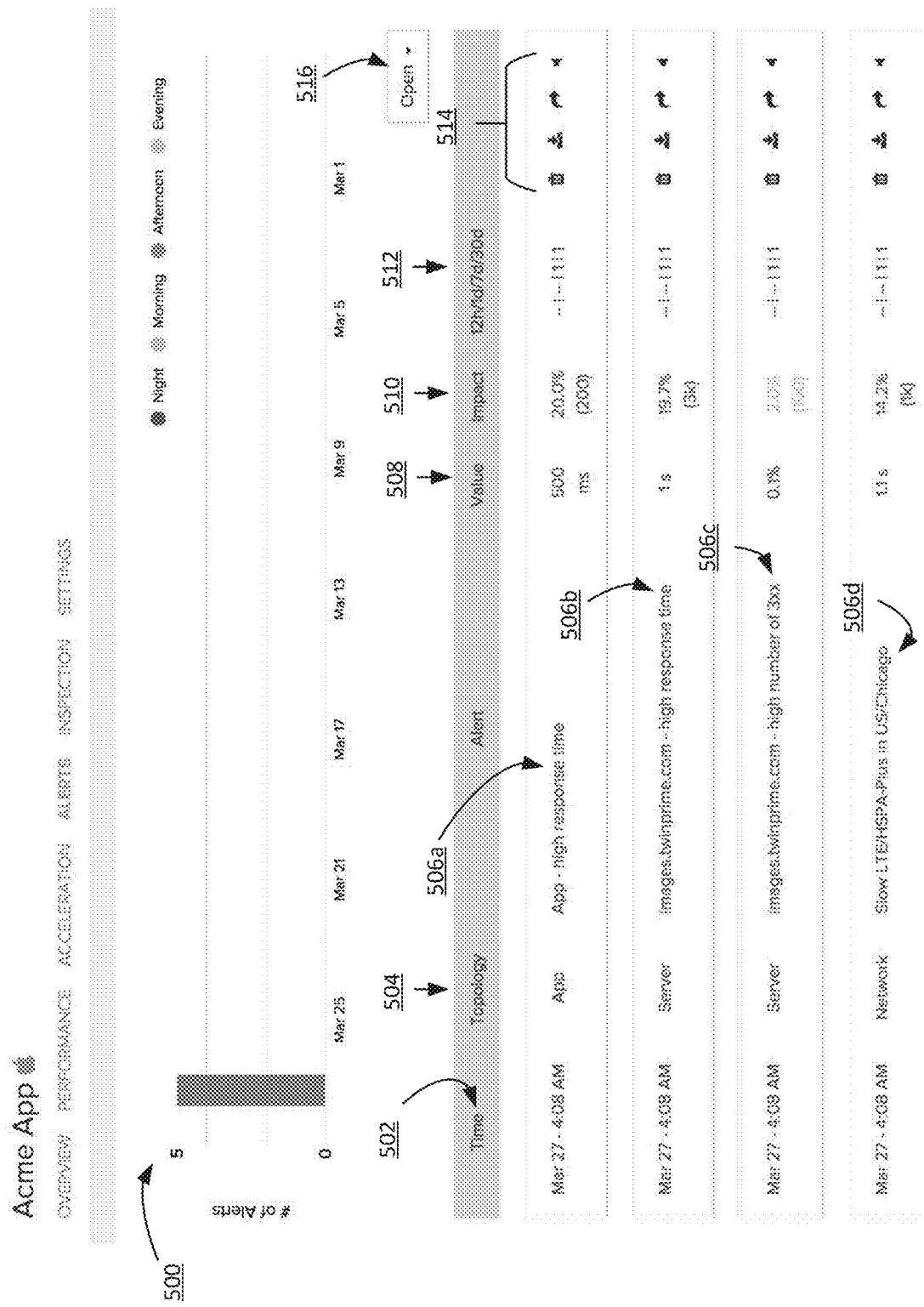
FIG. 5 is an example screenshot of a presentation of network performance analysis, according to an embodiment of the invention.

An alert may be displayed on a user interface presented by a performance analyzer 122, such as a dashboard illustrated in FIG. 5 or other user interfaces presented on user devices 102 connected to the performance analyzer 122 through networks 210. In one embodiment, alerts are displayed on a user interface upon generation by the alert generator 218. In another embodiment, alerts may be displayed upon request according to user configurations of the user interface.

An alert generator 218 generates alerts based one or more data attribute values. For example, when an inspection item is deemed to be a problem, the performance analyzer 122 may identify the metrics that are triggering the problem. If the download time of the first image is an inspection item, the performance analyzer 122 may examine if the app read time was high, or if the access network transmission rate was low, or if the server response time was high. Depending on the component that is correlated with the problem, the recommendation engine 120 flags the component of the system for further analysis. This flag may be in the form of an alert generated by the alert generator 218. This helps to drastically reduce root-cause analysis time for the app owner. Instead of generating numerous alerts based on a simple measurement exceeding a threshold, a more comprehensive alert and intelligent recommendation may be provided for display in a user interface based on the impact to the system using rules configured by administrators of the performance analyzer 122.

An example indication by the recommendation engine 120 may be "The download complete time for the first image of the app is high in US/New York time zone. The corresponding server response time for these Clients was higher than baseline. Recommendation is to examine server component. Impact 600 ms per user session." Here, the alert provided is comprehensive and relies on several components of the content delivery system. The download complete time is a client-side metric on the application component, whereas the server response time associated with those clients are server-side metrics. Based on rules in the recommendation engine 120, a recommendation is included with the alert to inspect the server component. The impact of fixing the problem here is estimated at 600 ms per user session, a time-based estimate of impact on network performance (or perception of network performance).

Further, this data may be delineated over time by application versions and aides in regression analysis. Questions such as "what version of the app did this problem first appear" or "has this problem happened in the server component in the past revisions" may be answered by tracking anomalies associated with the inspection points over time. As a result of more efficient analysis of system problems, the use of inspection points and data-driven alerts to performance issues may lead to increases in efficiency of the overall system performance, server and/or client computing performance, and may also help in responding to problems that cause network performance issues in a more efficient manner.

4. ASSESSING THE IMPACT OF EXCEEDING A THRESHOLD

Figure 3:
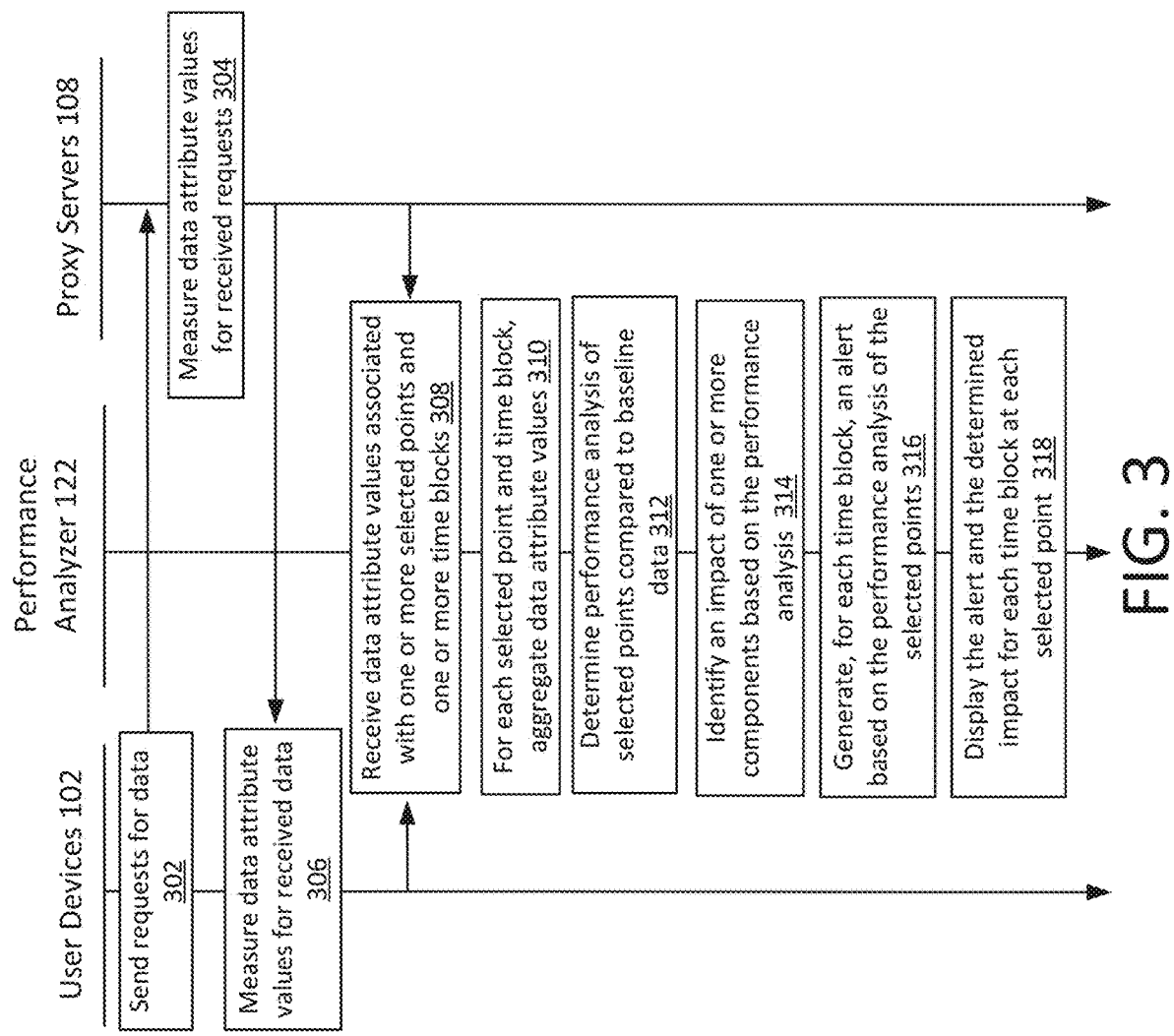
FIG. 3 illustrates a high-level interaction flow diagram of network performance analysis, according to an embodiment of the invention.

FIG. 3 illustrates a high-level interaction diagram of network performance analysis, according to an embodiment. User devices 102 send requests for data 302 to proxy servers 108. In response, proxy servers 108 measure data attribute values for received requests 304. As data is sent from proxy servers 108 to user devices 102, data attribute values for received data may be measured 306 by user devices 102. Such data attribute values may include download completion time, time to download a first image, server response time, and so forth.

A performance analyzer 122 receives 308 data attribute values associated with one or more selected points and one or more time blocks from user devices 102 and/or proxy servers 108. For each selected point and time block, data attribute values are aggregated 310. Data aggregation may include statistical analysis, such as determining a median, average, standard deviation, moving average, or other statistical method, in an embodiment. In a further embodiment, data aggregation may include a total number, or summation, of values, such as a number of abandoned sessions, computed as a percentage of a larger number, such as a total number of sessions. Selected points may also be referred to as diagnosis points.

A performance analysis of selected points compared to baseline data is determined 312. Here, a performance analysis may include a data analysis of the data attribute values captured in comparison to baseline data for the selected points. For example, the response time for a server may be high if it is higher than a baseline response time for the server. In one embodiment, performance analysis may be determined 312 in a tiered analysis, such as a moderate, high, or extreme rating, based on rules and/or configuration settings by an administrator user. The performance analysis may be color-coded based on this tiered analysis, such that the value as presented to the user is color-coded based on the tier (e.g., yellow for moderate, orange for high, red for extreme), in one embodiment. One or more parameter modifications, such as performing steps to reduce response time for a server, may be recommended in this tiered analysis, in one embodiment.

An impact of one or more components is identified 314 based on the performance analysis. The performance analysis may be triggered by one or more components in the system. The potential problem areas may include the client system (user device 102), the access network (network 104), and/or the server (problems on a data center 110 may be identified by a proxy server 108 in some proximity to the data center 110). As described above, the impact may be computed, or projected, based on a calculated savings, in time or other unit of measure, using the baseline data and the performance analysis. In this way, the impact of the one or more components may be used to prioritize the selected points of inspection. Additionally, because the identified impact may be distributed amongst different components in different topologies (e.g., client, network, or server), the selected points of inspection may be further prioritized by domain expertise. For example, an app owner may have limited expertise in handling a network infrastructure issue that is identified as having a large impact on app performance. As a result, the app owner may delegate that task to one having the right expertise to handle the point of inspection. By correlating the multiple components that may be affecting an app and projecting the estimated impact of each selected point, the performance analyzer 122 provides a streamlined root-cause analysis experience for the administrator user. This more efficient analysis of system problems using inspection items enables automatic or operator-initiated modifications to system parameters that increases efficiency of the overall system performance, in an embodiment.

For each time block, an alert is generated 316 based on the performance analysis of the selected points. Alerts are generated 316 based on rules configured by administrator users. For example, an alert may be generated if the data attribute value received is higher than a baseline. Rules may be tailored for specific points of inspection, in an embodiment. The alert and the determined impact for each time block at each selected point is then displayed 318. The display may occur through a user interface accessible by the administrator user, in an embodiment. For example, data analysis presenter 208 may display the alert and determined impact in an example dashboard as illustrated in FIG. 5.

Figure 4:
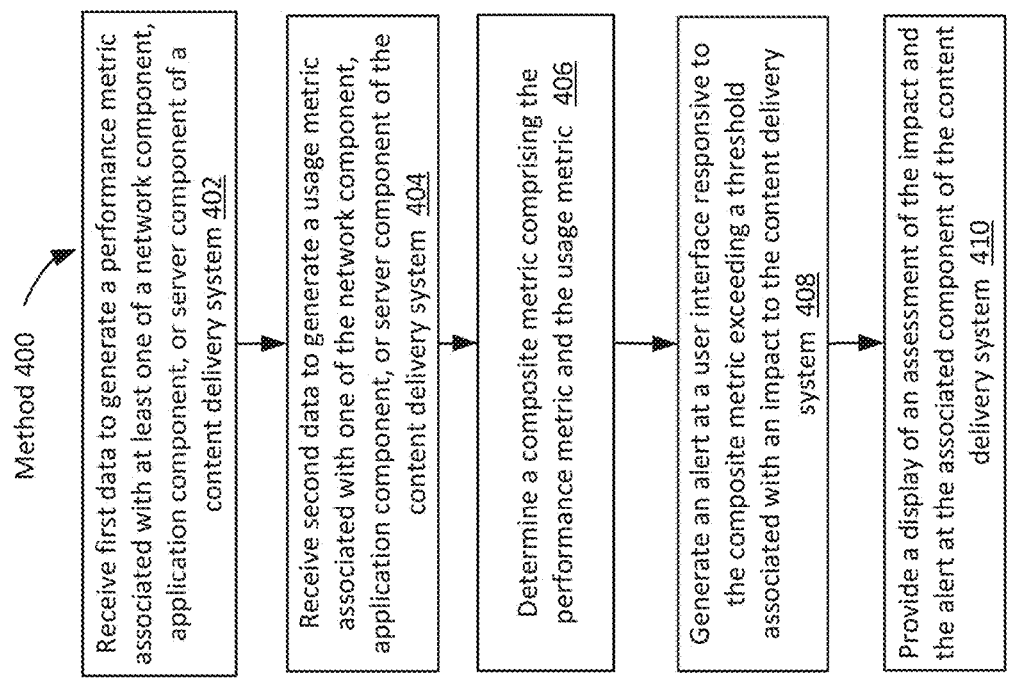
FIG. 4 illustrates a flowchart for network performance analysis, according to an embodiment of the invention.

FIG. 4 illustrates a flowchart for network performance analysis, according to an embodiment of the invention. Method 400 may be used in network performance analysis, in an embodiment. First data to generate a performance metric associated with at least one of a network component, application component, or server component of a content delivery system may be received 402. First data may include raw network data, client-side metrics, server-side metrics, or data analysis gathered and/or generated by the performance analyzer 122. As mentioned above in the description with respect to FIG. 1, measurements may be taken at a client-side via an agent, within an access network via a proxy server, and/or server-side via the proxy server and/or a server agent. The data measurements are stored in the metrics data store 118 for use by the performance analyzer 122.

Second data is received 404 to generate a usage metric associated with one of the network component, application component, or server component of the content delivery system. For example, a client agent, or an agent 114, may measure end-to-end performance attributes from the perspective of the user. For example, measuring download complete time of an object at the client agent captures the time taken to place the request on the network, the time taken for the server to respond, and the time taken for the response to reach the user and render on the user's screen. Other download times, or response times, may also be part of the download complete time of an object, such as user interface responses, content listings, selection confirmations, and so forth. This data attribute value then, the download complete time of an object at the agent 114, is second data that is received 404 to generate a usage metric of an application component of the content delivery system, in one embodiment. Other data attribute values may be received 404 as second data to generate a usage metric associated with different components, such as access networks within a network 104, and at proxy server 108 located near a data center 110. A usage metric may refer to a network usage measurement, such as a percentage of bandwidth used over time, various data aggregations of usage, access network usage among the various networks available for use, and other information related to usage that may affect network performance. Based on experiments and/or observations, usage of a particular network to transfer data, based on peering relationships defined by network operators, may impede performance during certain times of day in certain geographic locations. As mentioned above, various combinations of metrics may affect and/or impact network performance that may not be humanly possible to parse through. In striking contrast, a recommendation engine 120 may, through the methods described herein, identify a network usage pattern that has led to a less than optimal network performance and/or perceived network slowdown over time. In one embodiment, information about the network 104 and/or data center 110 may be captured using third party services.

A composite metric comprising the performance metric and the usage metric are determined 406. The composite metric is determined 406 using one or more rules configured by an administrator user, or based on a selected algorithm. An alert may be generated 408 at a user interface responsive to the composite metric exceeding a threshold associated with an impact to the content delivery system, as described above. A display of the assessment of the impact and the alert at the associated component may then be provided 410. The display of the assessment of the impact of the anomaly and the point of inspection may be provided 410 by a data analysis presenter 208, for example, as an example dashboard illustrated at FIG. 5.

Characteristics of modern networks change at a very rapid clip. The diversity of devices, content, device types, access mediums, etc., further compound the volatility of the networks. These facets make the problem hard to characterize, estimate or constrain resulting in inefficient, slow and unpredictable delivery of any content over these networks. However, there is a large amount of information about the network available in the transit traffic itself—from billions of devices consuming data. This information that describes network operating characteristics and defines efficacy of data delivery strategies is called a "network imprint".

5. GENERATING ALERTS BASED ON IMPACT AND PERFORMANCE ANALYSIS

FIG. 5 illustrates an example screenshot of a graphical presentation of network performance analysis, according to an embodiment of the invention. FIG. 5 illustrates an example screenshot of an alerts screen. A bar graph 500 illustrates the number of alerts generated across a number of days in the past month, and the bar graph 500 is color coded based on the time of day the alerts were generated. A tabular report of the alerts is presented in the alerts screen of FIG. 5. In time column 502, it is noted that at 4:08 AM on March 27, four alerts were generated. Topology column 504 indicates the component associated with each alert. Alert 506a, for example, affected the "APP" topology because the app had exhibited a high response time. The value column 508 indicates that the response time was 500 ms, which was an impact of 20%, noted in the impact column 560. A historical tally column 512 illustrates the number of alerts generated in the past 12 hours, 1 day, 7 days, and 30 days. For alert 506a, there was an alert generated within the last 7 days and with the last 30 days. Actions 514 associated with each alert include deletion, downloading data associated with the alert, forwarding the alert in a message, and adjusting notifications for the alert, indicated by the logos illustrated on the report for each alert 556.

In the example illustrated in FIG. 5, multiple alerts 506 were generated at the same time on different components. The high response time at the app alert 506a was also coupled with a high response time at the URL "images.twinprime.com" as noted in alert 506b. Additionally, the network infrastructure associated with alert 506d indicates that LTE/HSPA-Plus in US/Chicago was described as "Slow." Alert 506c indicates that a high number of 3xx HTTP status codes were generated at the URL "images.twinprime.com" which may be attributed to the slow network or to content being moved to a different URL. In other embodiments, bar graph 500 may be replaced with any other graphical representation such as: scatter plot, pie chart, line graph, etc. Drop-down menu 516 enables a filter to be applied to the displayed alerts 506. Here, the "Open" alerts are shown. "All" and/or "Closed" alerts may be filtered using the drop-down menu 516. Other functionality may be included in the drop-down menu 516.

The approaches described herein allow embodiments to compute this network imprint. Embodiments include an apparatus comprising a processor and configured to perform any one of the foregoing methods. Embodiments include a computer readable storage medium, storing software instructions, which when executed by one or more processors cause performance of any one of the foregoing methods. Note that, although separate embodiments are discussed herein, any combination of embodiments and/or partial embodiments discussed herein may be combined to form further embodiments.

6. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
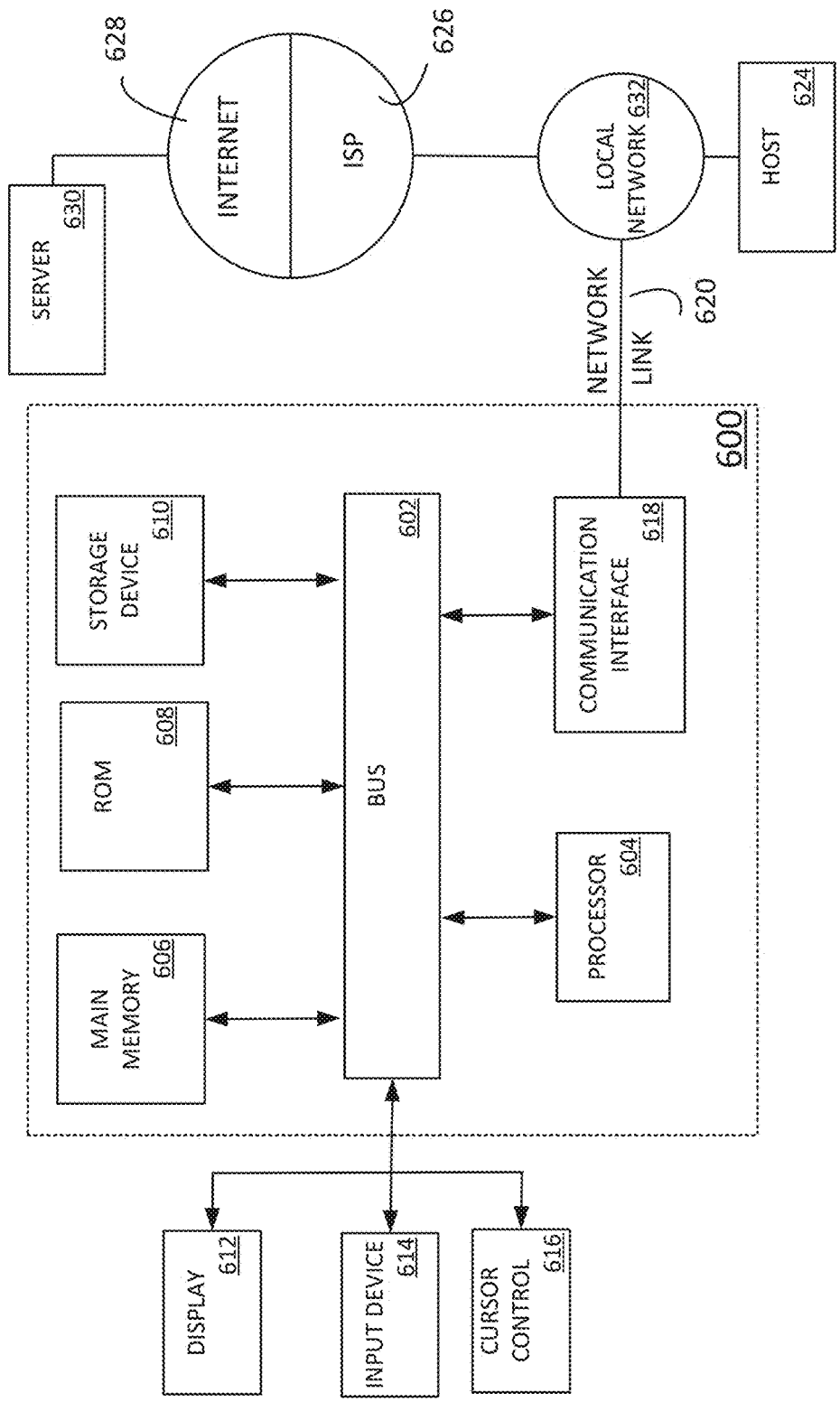
FIG. 6 illustrates an example hardware platform on which a computer or a computing device as described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is device-specific to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using device-specific hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. EQUIVALENTS, EXTENSIONS, ALTERNATIVES, AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of operation of a network performance analyzer, comprising:
    selecting an inspection point among a plurality of inspection points in a content delivery system based on an impact upon a particular application program;
    analyzing first data in order to calculate a performance metric associated with at least one of a network component, an application component, or a server component of the content delivery system at the inspection point;
    analyzing second data in order to calculate a usage metric associated with one of the network component, the application component, or the server component of the content delivery system at the inspection point, the second data including end-to-end performance measurements received by the network performance analyzer from one or more user device agents;
    wherein the network performance analyzer receives at least a portion of the first data and the second data from the one or more user device agents and one or more proxy servers, the one or more proxy servers communicate user device data requests to one or more server components of the content delivery system;
    determining a composite metric comprising the performance metric and the usage metric;

responsive to the composite metric exceeding a threshold associated with an impact to the content delivery system:
generating an alert at a user interface of the content delivery system; and
generating a recommendation to improve a portion of the content delivery system that improves overall network performance as perceived by network users based on the composite metric.

2. The method as recited in claim 1, wherein the application component comprises an agent on a user device of the content delivery system and the data is received from the agent.

3. The method as recited in claim 1, wherein the server component comprises a proxy server communicatively coupled to a server and the data is received from the proxy server, wherein the data is associated with the server.

4. The method as recited in claim 1, wherein the performance metric comprises a data attribute value compared to a baseline data value.

5. The method as recited in claim 1, wherein the usage metric comprises one or more data attribute values describing usage of one of the network component, application component, or server component.

6. The method as recited in claim 1, wherein the threshold associated with the impact comprises a quantitative measurement based on historical data.

7. One or more non-transitory computer-readable storage media, storing one or more sequences of instructions for operation of a network performance analyzer, which when executed by one or more processors cause performance of:
selecting an inspection point among a plurality of inspection points in a content delivery system based on an impact upon a particular application program;
analyzing first data in order to calculate a performance metric associated with at least one of a network component, an application component, or a server component of the content delivery system at the inspection point;
analyzing second data in order to calculate a usage metric associated with one of the network component, the application component, or the server component of the content delivery system, the second data including end-to-end performance measurements received by the network performance analyzer from one or more user device agents;
wherein the network performance analyzer receives at least a portion of the first data and the second data from the one or more user device agents and one or more proxy servers, the one or more proxy servers communicate user device data requests to one or more server components of the content delivery system;
determining a composite metric comprising the performance metric and the usage metric;
responsive to the composite metric exceeding a threshold associated with an impact to the content delivery system:
generating an alert at a user interface of the content delivery system; and
generating a recommendation to improve a portion of the content delivery system that improves overall network performance as perceived by network users based on the composite metric.

8. The one or more non-transitory computer readable medium as recited in claim 7, wherein the application component comprises an agent on a user device of the content delivery system and the data is received from the agent.

9. The one or more non-transitory computer readable medium as recited in claim 7, wherein the server component comprises a proxy server communicatively coupled to a server and the data is received from the proxy server, wherein the data is associated with the server.

10. The one or more non-transitory computer readable medium as recited in claim 7, wherein the performance metric comprises a data attribute value compared to a baseline data value.

11. The one or more non-transitory computer readable medium as recited in claim 7, wherein the usage metric comprises one or more data attribute values describing usage of one of the network component, application component, or server component.

12. The one or more non-transitory computer readable medium as recited in claim 7, wherein the threshold associated with the impact comprises a quantitative measurement based on historical data.

13. An apparatus, comprising:
a performance metric calculator, implemented at least partially in a hardware processor, configured to select an inspection point among a plurality of inspection points in a content delivery system based on an impact upon a particular application program;
the performance metric calculator further configured to analyze first data in order to calculate a performance metric associated with at least one of a network component, an application component, or a server component of the content delivery system at the inspection point;
a usage metric calculator, implemented at least partially in the hardware processor, configured to analyze second data in order to calculate a usage metric associated with one of the network component, the application component, or the server component of the content delivery system, the second data including end-to-end performance measurements received by the network performance analyzer from one or more user device agents;
wherein at least a portion of the first data and the second data are received from the one or more user device agents and one or more proxy servers, the one or more proxy servers communicate user device data requests to one or more server components of the content delivery system;
a composite metric calculator, implemented at least partially in the hardware processor, configured to determine a composite metric comprising the performance metric and the usage metric;
an alert generator, implemented at least partially in the hardware processor, that responsive to the composite metric exceeding a threshold associated with an impact to the content delivery system:
generates an alert at a user interface of the content delivery system; and
generates a recommendation to improve a portion of the content delivery system that improves overall network performance as perceived by network users based on the composite metric.

14. The apparatus as recited in claim 13, wherein the application component comprises an agent on a user device of the content delivery system and the data is received from the agent.

15. The apparatus as recited in claim 13, wherein the server component comprises a proxy server communicatively coupled to a server and the data is received from the proxy server, wherein the data is associated with the server.

16. The apparatus as recited in claim 13, wherein the performance metric comprises a data attribute value compared to a baseline data value.

17. The apparatus as recited in claim 13, wherein the usage metric comprises one or more data attribute values describing usage of one of the network component, application component, or server component.

18. The apparatus as recited in claim 13, wherein the threshold associated with the impact comprises a quantitative measurement based on historical data.

\* \* \* \* \*